May 28, 1940.　　A. L. FREEDLANDER ET AL　　2,202,250
BELT CONNECTOR
Filed Dec. 2, 1938
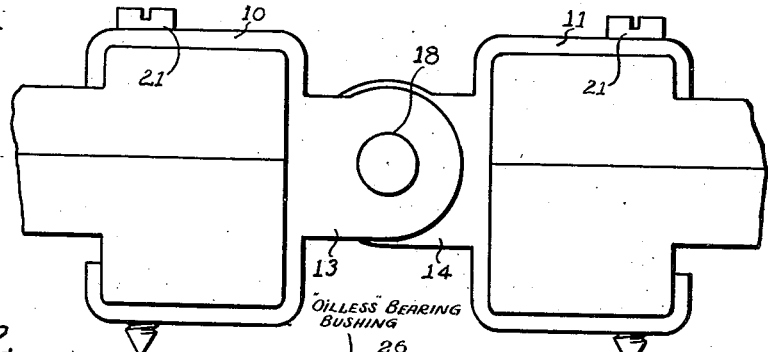
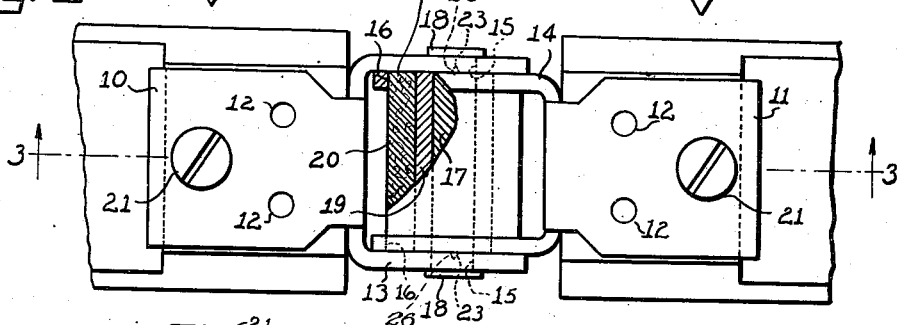
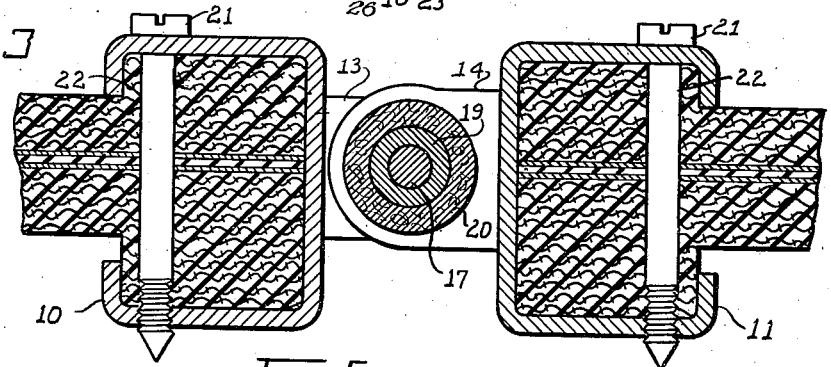
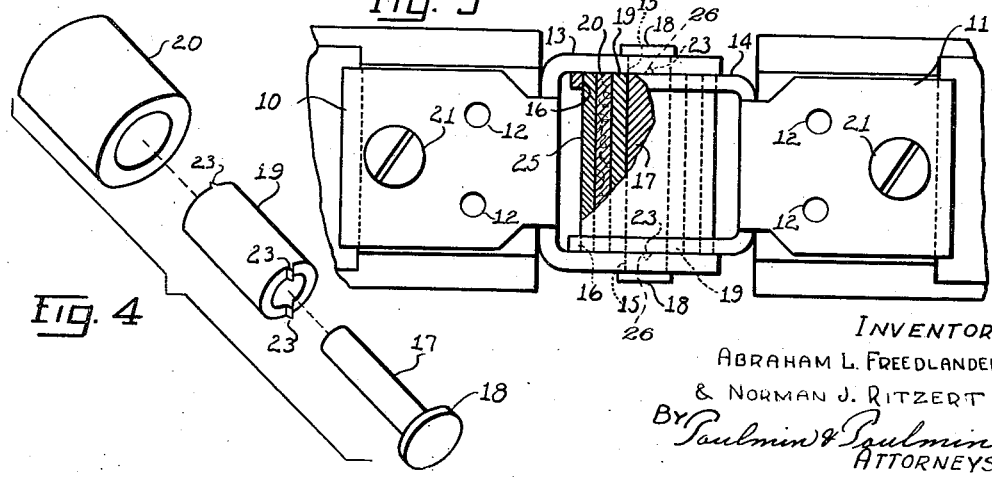
INVENTORS
ABRAHAM L. FREEDLANDER,
& NORMAN J. RITZERT
By Toulmin & Toulmin
ATTORNEYS Patented May 28, 1940

2,202,250

UNITED STATES PATENT OFFICE 2,202,250

BELT CONNECTOR

Abraham L. Freedlander and Norman J. Ritzert, Dayton, Ohio, assignors to The Dayton Rubber Manufacturing Company, Dayton, Ohio, a corporation of Ohio Application December 2, 1938, Serial No. 243,606

13 Claims. (Cl. 24—33)

This invention relates to belt connectors and, in particular, to belt connectors having bearing members interposed between the ends of the belt.

One object of this invention is to provide a belt connector containing a hollow bearing member, a tubular bearing element supported thereby, preferably of hardened metal, and a retaining member within the tubular bearing element for holding the parts in association.

Another object is to provide a belt connector having a hollow bearing member associated with a tubular bearing element and a retaining member passing through the bearing element and engaging the belt straps, the tubular bearing element having projections on the ends thereof for locking it in fixed relationship with the belt connector straps which it engages.

Another object is to provide a belt connector of the previously described types, wherein the tubular bearing element consists of a hardened steel roller and the hollow bearing member consists of a self-lubricating bearing bushing.

Another object is to provide a belt connector consisting of belt straps having interengaging portions, one portion carrying a hollow bearing element and the other portion carrying a hardened tubular bearing roller with a retaining member passing therethrough, an additional sleeve being provided to encircle the hollow bearing member to provide support for the latter, particularly where the hollow bearing member consists of a relatively soft alloy such as those used in certain types of self-lubricating bearing bushings.

This application is a continuation in part of our copending application Serial No. 84,916, filed June 12, 1936, now Patent No. 2,151,095, issued March 21, 1939.

In the drawing:

Figure 1 is a side elevation of a preferred embodiment of the belt connector of this invention;

Figure 2 is a top plan view, partly broken away, and showing the belt connector of Figure 1;

Figure 3 is a vertical longitudinal section through the belt connector shown in Figure 1, taken along the lines 3—3 in Figure 2;

Figure 4 is a perspective view of the bearing mechanism of Figures 1 to 3, with the parts disassembled, but in alignment for assembly; and Figure 5 is a top plan view similar to Figure 2, but showing a modification.

Referring to the drawing in detail, Figures 1 to 3 show a belt connector having straps or clamps 10 and 11 having holes 12 therein for lightening the weight of the belt connector and for giving additional anchorage to the belt ends by reason of the tendency of the belt portions adjacent the holes 12 to squeeze into these holes.

The straps 10 and 11 are provided with interengaging side portions 13 and 14, respectively. The side portions 13 of the clamp 10 are provided with aligned holes 15. The side portions 14 of the clamp 11, however, are provided with larger aligned holes 16. Through the holes 15 passes a connecting member 17, the ends thereof having enlarged heads 18 to retain the mechanism in assembled condition.

Surrounding the connecting member 17 is a tubular roller 19 of hardened steel or other suitable material, and surrounding the latter is a bearing bushing 20 of a self-lubricating type preferably. The ends of the bearing bushing 20 are held within the holes 16 in the side portions 14 of the belt clamp 11. The bearing bushing 20 may consist of an alloy or material having a lubricant impregnated therein, such as petroleum derivative or graphite.

If necessary, the bearing bushing 20 may be surrounded by an additional sleeve 25 (Figure 5), where the bearing bushing material is incapable of self-support. The latter condition occasionally arises in bearing bushings formed of Babbitt-metal impregnated with graphite. The belt connector is attached to the belt by means of the usual screws 21 passing therethrough by way of the holes 22 (Figure 3).

It will be obvious that means other than the enlargement of the heads 18 may be used to secure the connecting member 17 in position. In order to prevent relative rotation between the connecting member 17 and the tubular member 19, the latter is provided with radial ridges 23 which bite into the side portions 13 of the belt clamp 10. Reference numeral 26 (Figures 2 and 5) indicates the depressions formed in side portion 13 by this biting action.

In the operation of the belt connector shown in Figures 1 to 5 inclusive, the bearing members 19 and 20 partially rotate relatively to one another as the opposite nose portions 13 and 14 of the belt straps 10 and 11 tilt relatively to one another. The friction thus generated creates heat which brings out the lubricant impregnated in the bearing bushing 20, thereby providing a lubricant film between the inner surface of the bearing bushing 20 and the outer surface of the hardened tubular roller 19. The connecting member 17 may thus be of relatively soft and inexpensive metal so that the ends 18 may be upset easily to provide the enlargements for holding the belt connector parts in assembly. The bearing function of the belt connector, however, is sustained by the hardened tubular element 19, rather than by the connecting member 17.

It will be understood that we desire to comprehend within our invention such modifications as come within the scope of the claims and the invention.

Having thus fully described our invention, what we claim as new and desire to secure by Letters Patent is:

1. A belt connector comprising a pair of interlacing belt clamps, a connecting member interconnecting said belt clamps, a hollow tubular member surrounding said connecting member, means on said tubular member to prevent relative rotation between said member and said connecting member, and a bearing bushing surrounding said tubular member and supported by one of said belt clamps.

2. A belt connector comprising a pair of belt clamps having interlacing side portions, a connecting member interconnecting the side portions of one of said belt clamps, a tubular member surrounding said connecting member, means on said tubular member to prevent relative rotation between said member and said connecting member, and a bearing bushing surrounding said tubular member and supported by the side portions of the other belt clamp.

3. A belt connector comprising a pair of belt clamps having interlacing side portions, a connecting member interconnecting the side portions of one of said belt clamps, a tubular member surrounding said connecting member, means on said tubular member to prevent relative rotation between said member and said connecting member, and a bearing bushing of lubricant-impregnated material surrounding said tubular member and supported by the side portions of the other belt clamp.

4. A belt connector comprising a pair of interlacing belt clamps, a connecting member interconnecting said belt clamps, a tubular member of relatively harder material than said connecting member surrounding said connecting member and fixedly engaging with one of said belt clamps, and a bearing bushing surrounding said tubular member.

5. A belt connector comprising a pair of interlacing belt clamps, a connecting member interconnecting said belt clamps, a tubular member of relatively harder material than said connecting member surrounding said connecting member and locked at its ends with the adjacent belt clamp walls, and a bearing bushing surrounding said tubular member and supported by one of said belt clamps.

6. A belt connector comprising a pair of interlacing belt clamps, a connecting member interconnecting the side portions of one of said belt clamps, a tubular member of relatively harder material than said connecting material fixed against free rotation surrounding said connecting member, and a bearing bushing of self-oiling type surrounding said tubular member and supported by the side portions of the other belt clamp.

7. A belt connector comprising a pair of interlacing belt clamps, a connecting member interconnecting said belt clamps, a tubular member comprising a metal roller of relatively harder material than said connecting member surrounding said connecting member, a bearing bushing surrounding said tubuuar member, and a bearing bushing retainer surrounding said bearing bushing.

8. A belt connector comprising a pair of interlacing belt clamps, a connecting member interconnecting said belt clamps, a metal containing tubular member of relatively harder material than said connecting member surrounding said connecting member, a bearing bushing surrounding said tubular member, and a bearing bushing retainer surrounding said bearing bushing and supported by one of said belt clamps.

9. A belt connector comprising a pair of interlacing belt clamps, a connecting member interconnecting said belt clamps, a tubular member of relatively harder material than said connecting member surrounding said connecting member, a self-oiling bearing bushing of lubricant-impregnated material surrounding said tubular member, and a bearing bushing retainer of harder material than said bearing bushing, said retainer surrounding said bearing bushing and being supported by the side portions of one of said belt clamps.

10. A belt connector comprising a pair of interlacing belt clamps, a connecting member interconnecting said belt clamps, a tubular member of relatively harder material than said connecting member surrounding said connecting member, and having projections thereon engaging one of said belt clamps and a bearing member surrounding said tubular member.

11. A belt connector comprising a pair of interlacing belt clamps, a connecting member interconnecting said belt clamps, a tubular member of relatively harder material than said connecting member surrounding said connecting member, projections on said tubular member engaging one of said belt clamps and a bearing member surrounding said tubular member, said projections engaging corresponding depressions in said last-mentioned belt clamp.

12. A belt connector comprising a pair of interlacing belt clamps, a connecting member interconnecting said belt clamps, a tubular member of relatively harder material than said connecting member surrounding said connecting member, radially directed projections on said tubular member interlocking with corresponding depressions in one of said belt clamps, and a bearing bushing surrounding said tubular member.

13. A belt connector comprising a pair of interlacing belt clamps, a connecting member interconnecting said belt clamps, a tubular member of relatively harder material than said connecting member surrounding said connecting member, radially directed projections on at least one end of said tubular member interlocking with corresponding depressions in one of said belt clamps and a bearing bushing surrounding said tubular member.

ABRAHAM L. FREEDLANDER.
NORMAN J. RITZERT.